Sept. 15, 1953    W. S. MELVILLE ET AL    2,652,502
PULSE GENERATING CIRCUIT
Filed Sept. 20, 1952
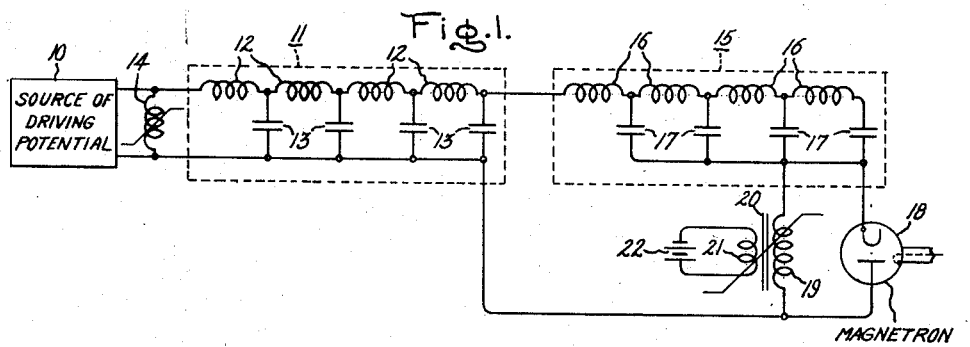
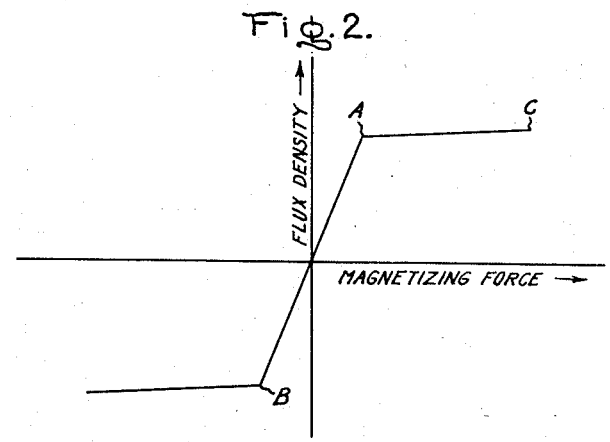
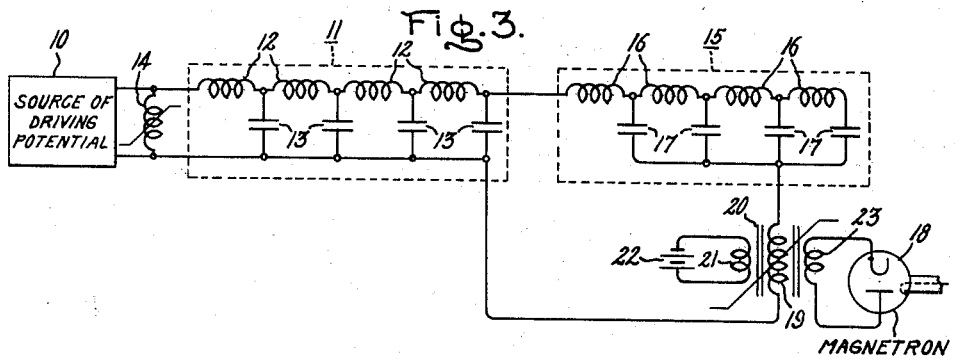
Inventors:
William S. Melville,
Guy R. Jackson,
by *Browell P. Truck*
Their Attorney.

Patented Sept. 15, 1953

2,652,502

UNITED STATES PATENT OFFICE 2,652,502

PULSE GENERATING CIRCUIT

William S. Melville and Guy R. Jackson, Rugby, England, assignors to The British Thomson-Houston Company Limited, a British company Application September 20, 1952, Serial No. 310,624
In Great Britain September 5, 1951

5 Claims. (Cl. 307—108)

Our invention relates to pulse generating circuits and, more particularly, to a circuit which includes a pulse forming network utilizing two equal cable units or delay lines and in which the pulse voltage obtained is equal to the line-charging voltage.

In a conventional modulator circuit when the charging time of the energy-storage device is large compared with the discharge time, if the load is a linear resistance, there will be few volts developed across it because the charging current is relatively small. When the load is a magnetron or some similar device that offers its inverse impedance, which is virtually infinite, to the charging current, it is usually necessary to shunt the load with an inductance. This offers a low impedance to the charging current, but a high impedance to the short duration pulse voltage which drives the current through the load.

When the charging time of the delay lines is large compared with the discharge time, the inductance may be linear. However, if the circuit including a pair of delay lines is used in conjunction with a magnetic modulator and a switching element of the saturable reactor type, the conditions are changed. The charging period for the circuit in this instance is short and may be comparable with the discharge period. A linear inductance presents a high impedance during the charging period, thereby producing a considerable voltage across the load.

An object of our invention is to prevent this considerable voltage across the load.

To that end there is provided, in accordance with the present invention, an inductance with special characteristics in these circumstances. Preferably, the inductance is one with a saturable core, which has a high permeability change from the unsaturated to the saturated state. The change in state occurs for a small change in magnetizing force, and the inductance is polarized so as to have a quiescent operating condition at the point wherein the change occurs. The inductance is utilized in its saturated state during the charging period, thus presenting a low impedance to the charging current. However, during discharge it operates in its unsaturated state of high permeability, thus presenting a high impedance to the pulse voltage. In this way it meets the required conditions.

In accordance with a modication of the invention, a transformer including a saturable core is employed if the load is such that a pulse transformer is required. The transformer may be polarized in the same manner as the inductance.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing in which:

Fig. 1 is a schematic diagram of a pulse generating circuit according to the present invention;

Fig. 2 represents an operating characteristic of a portion of the circuit shown in Fig. 1; and Fig. 3 illustrates a modification of the circuit shown in Fig. 1.

In Fig. 1 of the drawing, there is shown a source of driving potential 10 which supplies regularly-recurrent potential undulations to a delay line 11 comprised of a plurality of series inductors 12 and a plurality of shunt capacitors 13. The input circuit of line 11 is shunted by a saturable inductor 14.

The output circuit of delay line 11 is coupled to another delay line 15 that includes a plurality of series inductances 16 and shunt capacitors 17. The elements of line 15 are selected so that it has a delay characteristic similar to that of delay line 11.

A load comprised of a magnetron 18 is connected in series circuit relation with line 15 and inductor 19 is connected in shunt with the magnetron. A saturable core 20 for inductor 19 is provided with another winding 21 to which a saurce of saturating potential, such as battery 22, is connected.

In operation of the system, inductor 14 functions as a switch in response to amplitude variations of the potential supplied by source 10. Over a range of low amplitudes, its shunt impedance is very high and thus, during an increase of potential, current passes through line 11 and a charge builds up in capacitors 17 of line 15. As will be explained hereinafter, the charging occurs through inductor 19 which, in this portion of the operating cycle, presents a low impedance.

As a predetermined value of potential from source 10, usually arranged to coincide with maximum charge in line 15, inductor 14 saturates and its shunt impedance suddenly decreases. The switch in the input circuit of delay line 11 thus closes and a high voltage pulse is produced by the discharging of the lines through the switch and magnetron 18, inductor 19 presenting a high impedance in this portion of the operating cycle.

Insofar as the effects produced are concerned, the closing of this switch may be regarded as equivalent to the sudden application of a steady voltage to the input circuit of line 11 having the same magnitude as the source voltage, but of opposite polarity. The transient phenomena during the discharge corresponds to the transmission of this suddenly impressed reverse voltage through the system.

The wave front of the discharge travels through line 11 towards the output circuit. Upon the arrival of the generating pulse at the output circuit, current begins to flow in magnetron 18 and at the same time enters line 15. The current flow continues at a steady value until the wave entering line 15 returns to the input terminals of that line after being reflected at the open circuit output terminals. When that takes place, the current in the output circuit is neutralized by the reflected pulse and the current in the circuit drops to zero. The duration of the pulse is measured by the time taken for the generating pulse to travel through line 15 and back again and thus is equal to twice the delay time of that line.

The foregoing cycle of operation occurs for each undulation in the wave supplied by source 10. Therefore, successive pulses are applied to magnetron 18.

It is appropriate to point out that in the travel of the discharge wave front through line 11, an increase in voltage is effected. Thus, by employing a plurality of cascaded lines before line 15, a further increase in voltage may be obtained.

In order to best appreciate the effect of saturable inductor 19 on the operation of the circuit, reference is made to Fig. 2 which illustrates an approximation of the magnetization curve for the inductor, magnetizing force being plotted as abscissae and flux density being plotted as ordinates. As is well understood, the permeability of core 20 in region A—C of the illustrated curve is very low, whereas in region A—B, it is very high. Thus, if source 22 is adjusted to provide a unidirectional polarization voltage such that a quiescent operating condition is established at knee A, a current in the direction A—C causes the impedance in shunt with magnetron 18 to be low and a current in the direction A—B causes the impedance to be high.

The charging current in line 15 is made to operate in the direction A—C and the discharge current operates in the direction A—B. Thus, the shunt impedance of inductor 19 is low during the charging period and a negligible voltage is developed across it. However, its shunt impedance is high during the discharge period, during which a pulse is applied to load 18.

Inductor 19 permits load 18 to receive output pulses from line 15, but during the charging period it presents a very low impedance in shunt with magnetron 18. Therefore, undesirably high voltages may not develop and the pulse generating circuit embodying the present invention provides protection for the magnetron load.

In Fig. 3, there is shown a circuit that is a modification of the one illustrated in Fig. 1. Corresponding elements are designated by like reference characters.

Instead of magnetron 18 being connected directly in shunt relation with inductor 19, it is inductively coupled thereto by a third winding 23 on core 20. In other words, a saturable pulse transformer is employed in place of the saturable inductor of Fig. 1 and the operation of this embodiment may be understood by reference to the explanation presented in connection with Fig. 1.

While particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What we claim as new and desire to secure by Letters Patent of the United States is:

1. In combination, an energy-storage device, means for applying energy to charge said energy-storage device, a load impedance coupled to said energy-storage device, means for discharging said energy-storage device into said load, and a saturable impedance, coupled in shunt relation with said load impedance, having a high impedance value during operating intervals wherein said energy-storage device discharges into said load, and a low impedance value during other operating intervals wherein said energy-storage device charges.

2. In combination, an energy-storage device having input and output circuits, means for applying an undulating potential to said input circuit of said device to effect charging thereof during predetermined intervals, a load impedance coupled to said output circuit of said device, a switching device coupled to said input circuit of said energy-storage device for shunting said input circuit at the termination of each of said intervals, thereby causing said energy-storage device to discharge into said load impedance, and a saturable reactor coupled in shunt-relation with said load impedance and polarized to present a high impedance value during said discharge and a low impedance value during said charging.

3. In combination, an energy-storage device having input and output circuits, a source of charging potential coupled to said input circuit of said device for charging said device during predetermined intervals, a load impedance coupled to said output circuit, a saturable-reactor-type switching device coupled to said input circuit of said energy-storage device and effecting a relatively low shunt impedance at instances terminating each of said predetermined intervals, thereby causing said energy-storage device to discharge into said load impedance, a saturable reactor coupled in shunt relation with said load impedance and having a high impedance in response to energizing currents within a first operating range of magnitudes and a low impedance in response to energizing currents within a second operating range of magnitudes, and means for establishing a quiescent operating condition for said saturable impedance at a point intermediate said first and second ranges of magnitudes of energizing currents so that said low impedance is effected in response to charging of said energy-storage device and said high impedance is effected in response to discharge of said energy-storage device.

4. In combination, an energy-storage device having an output circuit, means for charging said device and for causing said device to discharge in said output circuit, a saturable impedance, coupled to said output circuit, having a low impedance during operating intervals wherein said device charges and a high impedance during other operating intervals wherein said device discharges, and a load impedance coupled to said output circuit and in shunt relation with said saturable impedance for receiving energy during at least a portion of each of said other operating intervals.

5. In combination, an energy-storage device having an output circuit, means for charging said device and for causing said device to discharge in said output circuit, a saturable impedance, coupled to said output circuit, having a low impedance during operating intervals wherein said device charges and a high impedance during other operating intervals wherein said device discharges, and a load impedance inductively coupled to said saturable impedance for receiving energy during at least a portion of each of said other operating intervals.

WILLIAM S. MELVILLE.
GUY R. JACKSON.

No references cited.